Sept. 23, 1969  O. H. HILLANDER  3,468,587
ARRANGEMENT FOR MOUNTING BEARINGS FOR COUNTER-ROTATING
SHAFTS AND A BEARING THEREFOR
Filed Oct. 25, 1967

3,468,587
ARRANGEMENT FOR MOUNTING BEARINGS FOR COUNTER-ROTATING SHAFTS AND A BEARING THEREFOR
Oscar Hilding Hillander, Malmo, Sweden, assignor to Stal-Laval Turbin AB, Finspong, Sweden
Filed Oct. 25, 1967, Ser. No. 678,026
Claims priority, application Sweden, Nov. 16, 1966, 15,659/66
Int. Cl. F16c 35/10
U.S. Cl. 308—15
5 Claims

ABSTRACT OF THE DISCLOSURE

The present arrangement relates to an arrangement for mounting a tail-end bearing for an inner shaft in an outer shaft in counter-rotating ship-propeller installations, and to a bearing for effecting such a mounting. In such an arrangement the forward propeller is shrink-fitted on the outer shaft and such shaft is thereby subjected to contraction. The present arrangement is such that the bearing for the inner shaft will be located in a perfectly centered position both before and after the shrinking-on of the propeller and it consists in the provision of co-operating surfaces on both the outer shaft and the bearing, some of such surfaces being in contact when the bearing is inserted within the outer shaft and others of said surfaces coming into contact only after the contraction takes place and at which time the first-mentioned surfaces become separated.

---

When shrinking the forward propeller onto the outer shaft of counter-rotating concentric propeller shafts, the outer shaft is subjected to contraction. If the compression involved in the shrink-fit is substantial, which is especially the case when it is desired to affix the propeller by shrink-fit alone, the contraction results in relatively large changes in the dimensions of the outer shaft. This introduces problems in regard to the mounting of the tail-end bearing for the inner shaft, this bearing being carried by the outer shaft in the zone that is subjected to contraction. If the bearing is mounted in a centered location in engagement with the bore of the outer shaft prior to the shrinking-on of the propeller, the shrinking-on of the propeller will result in the transmission of excessive forces from the outer shaft to the bearing. If the bearing is not mounted until after the shrinking-on of the propeller, the difficulty will arise that when the propeller is unshipped the bearing will be loosely supported in a non-centered location. A further disadvantage is that the outer dimensions of the bearing cannot be determined until after the shrinking-on of the propeller.

The present invention therefore concerns an arrangement for mounting the tail-end bearing of the inner one of counter-rotating propeller shafts in such a way that the bearing will be located in a centered position in the outer shaft both before and after the shrinking-on of the propeller.

Figure 1:
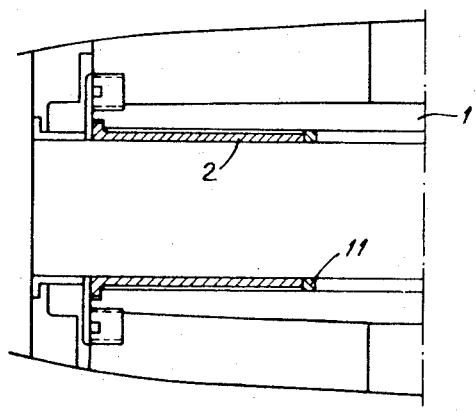
Figure 2:
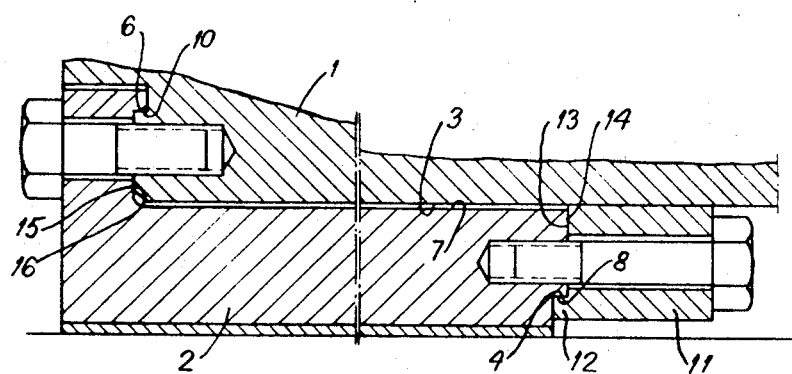

In the accompanying drawing, wherein an illustrative embodiment of the invention is disclosed, FIG. 1 shows a longitudinal section through the tail-end bearing and the two concentric propeller shafts, and FIG. 2, in a larger scale, shows a partial longitudinal section through the bearing mounted in the outer shaft prior to the shrinking-on of the propeller.

The bearing shown in the drawing consists of a sleeve-shaped cylindrical bearing body 2, the inner surface of which is lined with white metal, for example. The outer end of the bearing body 2 is provided with an annular flange by means of which bolted connections secure the axial location of the bearing relative to the outer shaft 1.

FIG. 2 shows the bearing 2 mounted in a centered position in the outer shaft 1 prior to the shrinking-on of the propeller on the outer shaft 1. Centering of the bearing 2 is achieved by the engagement of interacting locating surfaces 4, 8 and 6 at the two end portions of the bearing 2. All of the locating surfaces are arranged concentrically around the shaft center, the surfaces shown at 8 and 10 in the bearing 2 facing toward the center of the shaft and the corresponding surfaces 6 in the outer shaft and the surface 4 in a ring 11 fitted without clearance in the outer shaft, facing away from the center of the shaft. The ring 11 is axially secured to the bearing body 2 by means of bolted connections.

The locating surface 4 in the ring 11 is obtained by arranging an annular projection 12 of cylindrical or truncated conical shape on the part 11, which is rigidly connected to or formed integrally with the body 1 at the inner end of the component 2.

The outer shaft 1 and the bearing body 2 are arranged with two locating surfaces 3 and 7 respectively, of which the surface 3 on the outer shaft 1 faces toward the center of the shaft and the surface 7 on the bearing 2 faces away from the center of the shaft. Like the previously described locating surfaces 4, 8, 6 and 10, the surfaces 3 and 7 which in contact with each other are intended to achieve the centering of the bearing 2 after the shrinking-on of the propeller, are arranged concentrically around the center of the shaft. Locating surfaces 3 and 7 are furthermore arranged in the radial sense in such a relationship to one another and to the previously described locating surfaces 4, 8, 6 and 10 that prior to the shrinking-on of the propeller they are separated by a clearance corresponding to the amount of contraction.

When the propeller is shrink-fitted the locating surfaces 4, 6 and 3 will move radially inwardly toward the shaft center. The engagement with the locating surfaces 8 and 10 respectively of the bearing 2 will cease. At the final stage of shrinking-on, contact will be established between the locating surface 3 on the outer shaft and the locating surface 7 on the bearing 2, whereby the centering of the bearing 2 will be insured.

The shaft 1 and the bearing 2 are provided with matching radial locating surfaces 13, 14, 15 and 16 for axial location. The surfaces are arranged to slide on each other during the contraction and expansion of the shaft 1.

If the propeller is unshipped, the cycle will be repeated though in reverse sequence, with the result that the centering of the bearing will be maintained.

What I claim is:

1. An arrangement for mounting an annular or sleeve-shaped component having a bore, and particularly a bearing component, a pierced body having a cylindrical space, said body being subjected to contraction due to severe radial forces acting on it, and by which the bearing component will be retained in a central position in the body both before and after the contraction of the body and without the transference of excessive forces from the body to the bearing component comprising, the provision of two locating surfaces on the body concentric with the axis of the space therethrough, one of the locating surfaces being arranged and dimensioned to fit over body and the other locating surface facing away from said longitudinal center, the bearing having surfaces complementary to those formed on the body, one of the bearing surfaces being arrangd and dimensioned to fit over and make contact with one of the surfaces on the body at a time when the bearing is inserted within the body and prior to the contraction of said body, the body having another surface encircling one of the surfaces on the bearing and spaced therefrom, the latter two surfaces on the body and bearing coming into contact at the termination of the contraction of the body and after contact between the first-named locating surfaces on the body and bearing has been caused to cease due to the contraction of the body.

2. An arrangement according to claim 1, characterized in that the locating surface in the body which faces toward the longitudinal axis of the space is arranged on the circumferentially limiting surface of said space and the other locating surface in the body is arranged on an annular part which is connected to the body at the inner end of the bearing component, while one locating surface on the bearing component is arranged to the inner end of said bearing component and the other surface is on the cylindrical surface of the component.

3. An arrangement according to claim 2, wherein the locating surface on the end of the bearing component is obtained by providing a cylindrical or truncated conical recess in the end face of the component and one of the locating surfaces in the body is obtained by arranging a cylindrical or tapered conical annular projection on a part which is rigidly connected to the body at the inner end of the bearing component.

4. An arrangement according to claim 1, wherein the surfaces on the body and bearing component are provided with matching radial locating surfaces for the axial location of the component in the body, these surfaces sliding against one another during the expansion and contraction of the body.

5. An arrangement according to claim 4, wherein the body and the bearing component are provided with concentric locating surfaces at both the inner and outer ends of the bearing component.

References Cited
UNITED STATES PATENTS

| | | |
|---|---|---|
| 1,115,411 | 10/1914 | Dixon. |
| 1,514,166 | 11/1924 | Morgan et al. |
| 2,386,165 | 10/1945 | Landberg _____ 308—15 |

MARTIN P. SCHWADRON, Primary Examiner

F. SUSKO, Assistant Examiner